(12) United States Patent
Bauer

(10) Patent No.: US 7,770,938 B2
(45) Date of Patent: Aug. 10, 2010

(54) QUICK COUPLING

(75) Inventor: Andreas Bauer, Maintal (DE)

(73) Assignee: Norma Germany GmbH, Maintal (DE)

( * ) Notice: Subject to any disclaimer, the term of this patent is extended or adjusted under 35 U.S.C. 154(b) by 402 days.

(21) Appl. No.: 11/726,890

(22) Filed: Mar. 23, 2007

(65) Prior Publication Data
US 2007/0222216 A1    Sep. 27, 2007

(30) Foreign Application Priority Data
Mar. 25, 2006    (DE) .................. 10 2006 013 899

(51) Int. Cl.
*F16L 37/00*    (2006.01)
(52) U.S. Cl. .................. 285/305; 285/93; 285/308; 285/331
(58) Field of Classification Search .................. 285/93, 285/305, 308, 331, 320
See application file for complete search history.

(56) References Cited

U.S. PATENT DOCUMENTS

| | | | | |
|---|---|---|---|---|
| 2,098,423 A | * | 11/1937 | Kennedy | .................. 285/283 |
| 4,641,859 A | * | 2/1987 | Walters | .................. 285/27 |
| 4,929,002 A | * | 5/1990 | Sauer | .................. 285/319 |
| 4,991,882 A | * | 2/1991 | Gahwiler | .................. 285/331 |
| 2005/0161946 A1 | * | 7/2005 | Bauer | .................. 285/305 |
| 2005/0167980 A1 | * | 8/2005 | Bauer et al. | .................. 285/308 |
| 2005/0179258 A1 | * | 8/2005 | Brandt et al. | .................. 285/308 |

FOREIGN PATENT DOCUMENTS

DE        37 27 858        9/1989

\* cited by examiner

*Primary Examiner*—Aaron M Dunwoody
*Assistant Examiner*—Fannie Kee
(74) *Attorney, Agent, or Firm*—Lucas & Mercanti, LLP; Klaus P. Stoffel

(57) ABSTRACT

A quick coupling for joining two fluid lines includes a first part which has a projection with a. sloping surface directed towards one axial end and a stop face directed towards the other axial end, and a second part which has at least one bracket with a catch that engages behind the stop face in a locked position. An assembly indicator is arranged next to the catch. In the locked position, the indicator projects outward beyond a catch segment of the bracket on which the catch is located, but, in the unlocked position, the indicator projects outward at most as far as the catch segment.

11 Claims, 1 Drawing Sheet

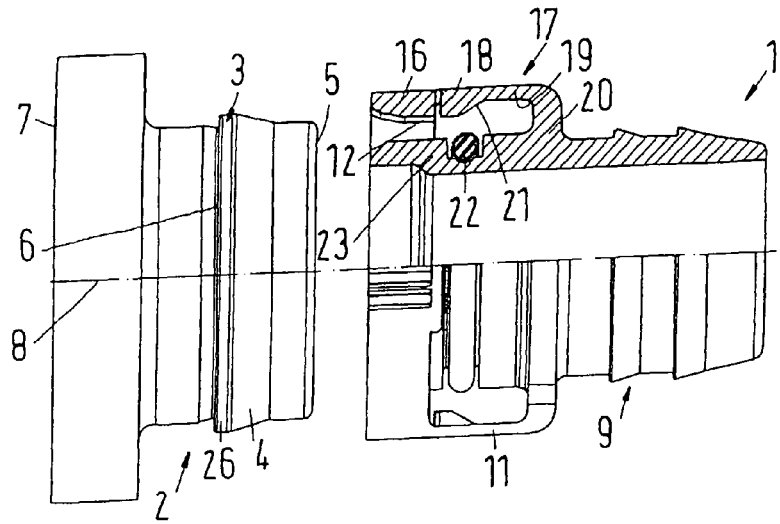
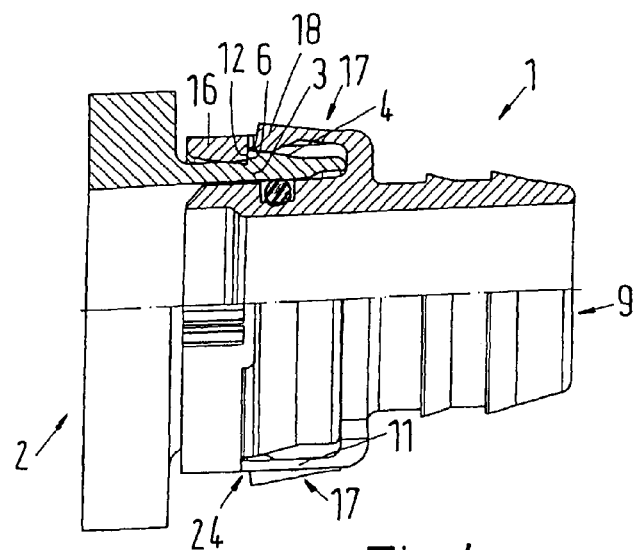
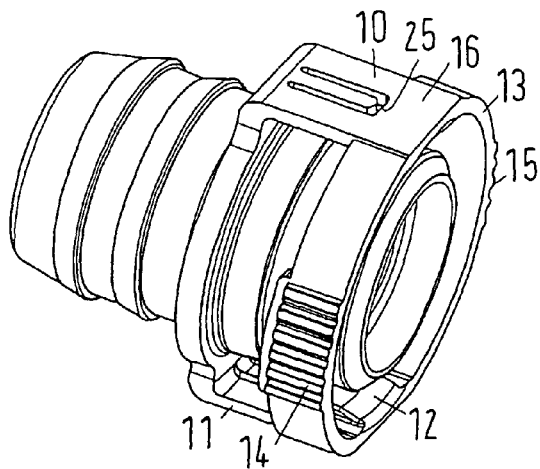
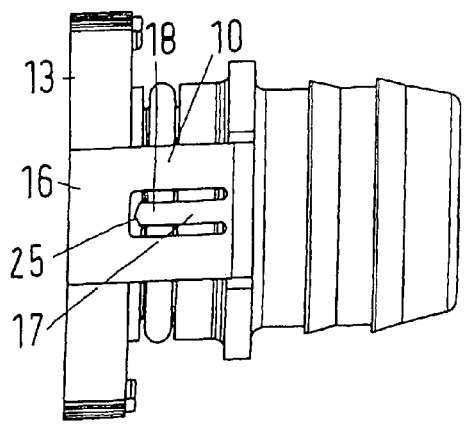

QUICK COUPLING

BACKGROUND OF THE INVENTION

1. Field of the Invention

The present invention relates to a quick coupling for joining two fluid lines, comprising a first part, which has a projection with a sloping surface directed towards one axial end and a stop face directed towards the other axial end, and a second part, which has at least one bracket with a catch, which catches behind the stop face in the locked position.

2. Description of the Related Art

A quick coupling of this type is described, for example, in DE 37 27 858 C2. In this known connector, the second part has two diametrically opposed brackets, which are joined by an elastically deformable ring. When the first part and the second part are put together, the projection pushes apart the two catches which abut on the sloping surface and cause the brackets to deform radially outward. When the catches have been moved past the projection, then the brackets spring back into their original configuration. When one wishes to release the quick coupling, the ring can be compressed in a direction offset about 90° from the axis on which the two catches are arranged. The two catches then increase their distance from each other, so that they clear the stop face. The second part can then be pulled out of the first part.

A quick coupling of this type has basically proven itself effective. However, under certain assembly conditions, it is difficult to determine reliably if the two parts have properly engaged. In many cases, the quick coupling is located in a place that cannot be seen, so that a visual check is practically impossible or can be made only with difficulty. In this case, acoustic confirmation is not always possible, either. If the noise level allows it, the assembler can hear a click when the two parts have been successfully assembled. The click indicates that the catch has snapped into place behind the projection. However, in an assembly environment in which the noise level is fairly high, for example, in a factory building in which motor vehicles are being assembled, this acoustic information may not always be available or sufficiently reliably available.

SUMMARY OF THE INVENTION

The object of the invention is to make it possible to recognize whether the quick coupling is correctly assembled.

This object is achieved with a quick coupling of the aforementioned type by arranging an assembly indicator next to the catch. In the locked position, the indicator projects outward beyond a catch segment of the bracket on which the catch is located, but in the unlocked position, it projects outward at most as far as the catch segment.

With an assembly indicator of this type, the assembler can feel or determine by touch whether the two parts of the quick coupling are properly connected with each other, i.e., whether the catch has or has not snapped into place behind the projection. If the catch has snapped into place behind the projection, then the assembly indicator projects outward beyond the segment of the bracket on whose radially inner surface the catch is located, the so-called catch segment. On the other hand, if the catch is not positioned behind the stop face, i.e., if it has not yet snapped into place, then the catch segment is pressed radially outward by the sloping surface and so is the assembly indicator. In this case, there is no step between the outside surface of the catch segment and the assembly indicator. The assembler can easily determine by the touch of his fingers whether this sort of step is present, i.e., whether he can feel the assembly indicator. If he can feel the assembly indicator, then the catch has snapped into place behind the stop face. If he cannot feel the assembly indicator, then the catch has not engaged, and the connection between the two parts of the quick coupling must be checked and corrected.

Preferably, the assembly indicator is rigidly connected with the second part. In an especially preferred design, it is formed as a single piece with the second part. This can be realized in a simple way if the second part is produced by injection molding. In this case, the assembly indicator can be injected together with the second part. If the assembly indicator is rigidly connected with the second part, then it is held undetachably on the second part and cannot be lost. When the two parts of the quick coupling are then properly joined, i.e., when the catch has snapped into place behind the stop face, then the assembly indicator can always be felt by the assembler.

The assembly indicator preferably has an indicator segment of the same thickness as the catch segment. As long as the catch has not snapped into place behind the stop face, the indicator segment and the catch segment form a common flat surface in which a step cannot be felt. This step that can be felt by the assembler does not form until after the catch has engaged behind the stop face. Manufacturing is facilitated by the use of segments of equal thickness.

In the unassembled state of the second part, the outer surface of the indicator segment is preferably flush with the outer surface of the catch segment. This means that in the unassembled state, there is no step between the catch segment and the indicator segment, including a step in the "wrong direction". Although it is basically possible reliably to determine the presence of a step by feeling it by sense of touch, not everyone is able to feel the direction in which a step is oriented. If care is taken to ensure that no step at all is present in the unassembled state, then no step will be present even during the assembly operation as long as the catch and the assembly indicator slide up the sloping surface together. The step does not appear until after the catch has snapped into place behind the stop face and the two parts are correctly assembled.

The indicator segment is preferably connected with the second part by a spring arm. The assembly indicator then springs back into its original position when the two parts are disassembled, so that the assembly indicator can be used again during a subsequent reconnection of the two parts.

In this regard, it is preferred for the indicator segment to be connected with the spring arm by a transitional segment of decreasing thickness. This makes it possible to realize a largely flat shape of the outer surface of the assembly indicator, so that no additional breaks or steps can arise here which could irritate the assembler as he checks the connection by feeling it.

The assembly indicator is preferably arranged within the bracket in the circumferential direction. The bracket thus has a relatively large available surface from which the assembly indicator projects when the catch is engaged. This makes it easy to determine by touch whether the two parts have been properly connected or not.

The assembly indicator preferably has a tip that points in the axial direction. The tip is then the part that projects radially outward the farthest. It can be easily felt by the assembler even if, for example, he is wearing gloves.

The axial distance between the assembly indicator and the catch segment is preferably at most as great as the axial extent of a circumferential surface of the projection that follows the stop face. This ensures that the indicator segment of the assembly indicator projects outward as far as possible beyond the catch segment when the catch has snapped into place behind the stop face. This makes it easier to detect the presence of the assembly indicator.

Preferably, at least two brackets with catches are provided, and each catch has an associated assembly indicator. This makes it possible to determine for each catch separately whether or not a connection has been successfully made, i.e., whether or not each individual catch has snapped into place behind the stop face. In many cases, it is sufficient if one catch is engaged behind the stop face. However, quality requirements demand that it be possible to check that all of the catches are engaged. This can be ensured in a simple way by providing a number of assembly indicators equal to the number of catches.

In this regard, it is preferred if the brackets are connected with each other by an elastically deformable ring. The ring additionally ensures that the catches are drawn radially inward and can thus snap into place behind the stop face. This also ensures that the catch segments are drawn radially inward beyond the assembly indicators or, to be more precise, beyond the indicator segments, which also makes it easier to check for proper connection.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

BRIEF DESCRIPTION OF THE DRAWING

In the drawing:

FIG. 1 is an exploded view showing a quick coupling before its two parts are joined;

FIG. 2 is a view, partially in section showing the quick coupling in its assembled state;

FIG. 3 is a perspective view of the second part; and

FIG. 4 is a top view of the second part of the quick coupling.

DETAILED DESCRIPTION OF THE INVENTION

A quick coupling 1 has a first part 2 with a peripheral projection 3, which has an axial sloping surface 4 directed towards one axial end 5 and a stop face 6 directed towards the other axial end 7. The sloping surface 4 is conically sloped. The stop face 6 is oriented essentially vertically to an axis 8 of the first part 2.

The quick coupling 1 has a second part 9. Two diametrically opposed brackets 10, 11 are located on the second part 9. Each bracket 10, 11 has a catch 12 on its radially inner surface. The brackets 10, 11 are joined by an elastically deformable ring 13. The ring 13 has gripping zones 14, 15 positioned approximately in the middle between the two brackets 10, 11. When the ring 13 is compressed in the gripping zones 14, 15, the brackets 10, 11 are bent radially outward, and thus the catches 12 are also moved radially outward.

Each catch 12 is located on a catch segment 16 of the bracket 10, 11.

An assembly indicator 17 is located in the middle of each bracket 10, 11. The assembly indicator 17 has an indicator segment 18, which is located on the side of the catch segment 16 that faces away from the first part 2. The indicator segment 18 has the same radial thickness as the catch segment 16. In the unassembled state (FIG. 1), the indicator segment 18 extends the same distance outward as the catch segment 16. On the inside as well, the indicator segment 18 extends radially inward the same distance as the catch segment 16.

The indicator segment 18 is mounted on a spring arm 19, which is connected as a single piece with a base 20, to which the bracket 10 is also attached. The assembly indicator 17 can be produced as a single piece with the other components of the second part 9, for example, by injection molding.

The indicator segment 18 makes a transition to the spring arm 19 via a transitional region 21, whose thickness decreases from the indicator segment 18 towards the spring arm 19.

A gasket 22 is provided on the second part 9 to seal a connector 23 of the second part 9 from the first part 2 after the connector 23 has been inserted in the first part 2.

When the first part 2 and the second part 9 are assembled, so that a connection is finally made, as shown in FIG. 2, then the catch 12 of each bracket 10, 11 first comes into contact with the sloping surface 4. As the second part 9 is pushed farther onto the first part 2, the catch 12 and thus the catch segment 16 are moved radially outward until the catch segment 16 has been moved past the projection 3 and the catch 12 snaps into place behind the stop face 6, i.e., moves radially inward and catches behind the stop face 6.

The indicator segment 18 of the assembly indicator 17, on the other hand, still rests on the sloping surface 4, so that it projects outward beyond the catch segment 16, i.e., the two segments are separated by a radial distance to produce a step 24, which can be easily felt by an assembler.

Of course, this step 24 is formed only after the catch 12 has snapped into place behind the stop face 6. As long as the catch segment 16 has not been moved beyond the projection 3, the outer surface of the indicator segment 18 of the assembly indicator 17 is located in the same plane as the outer surface of the catch segment 16. In other words, as long as the catch 12 has not snapped into place behind the stop face 6, the assembler cannot feel a step or projecting part.

As can be seen, for example, in FIGS. 1 and 2, an assembly indicator 17 is provided for each bracket 10, 11, so that a separate check can be made for each catch 12 with respect to whether it has snapped into place behind the stop face 6.

As is apparent, especially from FIGS. 3 and 4, the indicator segment 18 of the assembly indicator 17 has a tip 25, which ultimately extends the farthest from the bracket 10, 11 when the catch 12 has engaged properly behind the stop face 6. The formation of the indicator segment 18 with the tip 25 has the advantage that the tip 25 can be very easily felt by the assembler.

The axial distance between the indicator segment 18 and the catch segment 16 should be as small as possible. In any case, it should be at most as great as the axial extent of a circumferential surface 26 of the projection 3 that follows the stop face 6 in the direction of the first axial end 5 of the first part 2. This guarantees that the indicator segment 18 projects as far as possible from the bracket 10, 11 when the catch 12 is engaged behind the stop face 6.

While specific embodiments of the invention have been shown and described in detail to illustrate the inventive principles, it will be understood that the invention may be embodied otherwise without departing from such principles.

I claim:

1. A quick coupling for joining two fluid lines, the coupling comprising:

a first part having a first axial end, a second axial end, a projection with a sloping surface directed towards the first axial end and a stop face directed towards the second axial end;

a second part having at least one bracket with a catch, wherein the catch engages behind the stop face in a locked position; and an assembly indicator arranged next to the catch, wherein the indicator, in the locked position, projects outward beyond a catch segment of the bracket on which the catch is located, but, in the unlocked position, the indicator projects outward at most as far as the catch segment, wherein the assembly indicator has an indicator segment that rests on the sloping surface in the locked position.

2. A quick coupling in accordance with claim 1, wherein the assembly indicator is rigidly connected with the second part.

3. A quick coupling in accordance with claim 1, wherein the indicator segment is of the same thickness as the catch segment.

4. A quick coupling in accordance with claim 3, wherein in an unassembled state of the second part, the outer surface of the indicator segment is flush with the outer surface of the catch segment.

5. A quick coupling in accordance with claim 3, wherein the indicator segment is connected with the second part by a spring arm.

6. A quick coupling in accordance with claim 5, wherein the indicator segment is connected with the spring arm by a transitional segment of decreasing thickness.

7. A quick coupling in accordance with claim 1, wherein the assembly indicator is arranged circumferentially within the bracket.

8. A quick coupling in accordance with claim 1, wherein the assembly indicator has a tip that points in the axial direction.

9. A quick coupling in accordance with claim 1, wherein the axial distance between the assembly indicator and the catch segment is at most as great as the axial extent of a circumferential surface of the projection that follows the stop face.

10. A quick coupling in accordance with claim 1, comprising at least two brackets with catches wherein each catch has an associated assembly indicator.

11. A quick coupling in accordance with claim 10, wherein the brackets are connected with each other by an elastically deformable ring.

* * * * *